Patented Sept. 26, 1933

1,928,493

UNITED STATES PATENT OFFICE 1,928,493

HARDENING UREA CONDENSATION PRODUCTS

Arthur M. Howald, Pittsburgh, Pa., assignor to Toledo Synthetic Products, Inc., Toledo, Ohio, a corporation of Ohio No Drawing. Application September 26, 1930
Serial No. 484,718

14 Claims. (Cl. 18—55)

This invention relates to hardening urea condensation products; and it comprises an improvement in processes of producing articles containing glassy or porcelain-like condensation products derived from urea, thiourea, substituted ureas, etc., and formaldehyde wherein primary products so derived are hardened by an addition of one of the polyhydric phenols such as resorcinol, quinol, orcinol, pyrogallol, but advantageously resorcinol, followed by a subsequent heating in molding under heat and pressure; all as more fully hereinafter set forth and as claimed.

It has long been proposed to make condensation products from urea or thiourea with formaldehyde. Properly made, the final condensation products are of glassy nature, being indeed capable of replacing glass for many purposes and having the additional advantage that articles can be machined, threaded, bored, etc. With the use of a filler, articles of a porcelain-like nature can be made. Commercially, however, this art has not made much headway, because of a number of difficulties. Initial condensation is always in the presence of water and, usually, of more formaldehyde than is wanted in the final product. Unless the water and the formaldehyde are effectively removed, the final article will crack or craze or otherwise alter in time. Much of the quality of the final article seems to depend upon minutiæ in the primary condensing operation. In the usual practice, urea is dissolved in 40 per cent aqueous formaldehyde solution and the mixture brought to a boil. A violent reaction ensues and the mixture continues boiling under its own heat evolution. Boiling is under a reflux condenser to maintain constant volume and prevent loss of water and formaldehyde at this stage. Sometimes, base or acid is used as a catalyst; sometimes, not. In the standard method of operation, the molecular proportion of formaldehyde to urea is something in excess of 2:1 and, after boiling is completed, the liquid is evaporated to a sirupy or stiff consistency. While still liquid, it is poured into molds to form slabs or sheets and these are baked for a long time at a temperature of 80–100° C. If everything is right, the baked sheets can be cut into the desired articles. Slabs made in this way, with complete dissipation of excess formaldehyde and of water are necessarily quite thin.

Sometimes in the prior art, less proportions of formaldehyde are used in the primary reaction or a little more urea is added after the first violent reaction is over; after boiling is discontinued. Results, however, in so doing, are not very good. There is not sufficient formaldehyde present at a time when it seems, in this boiling operation, to be needed. If urea is added to the viscous liquid formed upon evaporation of the boiled liquid, uniform incorporation is difficult and really can only be done with a pugging mill.

In the present invention I depart from the cast-and-bake method of making molded articles found in the prior art and prepare a dry preparation which can be hot molded, that is, under heat and pressure, with the production of sound and satisfactory products. The preparations being dry, there is no liberation of water vapor in the hot mold.

In certain prior and copending applications, Serial Nos. 339,225 and 363,412, filed February 11, 1929, and May 15, 1929, respectively, I have described and claimed a similar method of operation in making finished articles wherein a dry preparation is used and the final hardening is effected in a molding press under heat and pressure; primary reaction products being converted into a dry powder, this mixed with dry urea and the mixture hot molded. Added urea or thiourea so admixed abbreviates hardening materially.

In my copending application Ser. No. 481,807, of which the present application is a continuation in part, I disclose processes wherein the substantially dried powdered primary or initial reaction products of urea and formaldehyde, are mixed with an added amount of urea or thiourea to produce molding compositions containing such admixtures of materials and substantially free of water and other volatiles.

In another application (Serial No. 484,719, filed Sept. 26, 1930), I have described and claimed a method of further simplifying production of these condensation products wherein the aldehyde and urea are brought together and undergo reaction in the cold; the usual high temperature operation being dropped. After initial condensation, the liquid material is evaporated and dried at a low temperature; the product being thereafter ground to a fine powder which is used as before, being admixed with urea or thiourea to make a molding powder. An admixture of a dry powder with dry urea has no tendency toward reaction prior to exposure to heat in hot molding. Where fillers are used, as they generally are, they are admixed with the liquid material and the evaporation and drying with production of a dry powder can be much simplified.

In any of the hereinafter described processes, I have found that, in lieu of using urea to facilitate hardening, there are advantages in using hardening agents of quite another class not at all analogous to urea; that class being the polyhydric phenols.

I have found that urea present as such in the dry mixture has a tendency to react too quickly in the mold, the molding operation being made somewhat more difficult thereby. Thiourea, while somewhat better than urea in this respect, is still open to some objection. On the other hand, polyhydric phenols do not have the tendency to early reaction with exposure to heat which characterizes urea. In a wet mixture they do not react; in the mold, they react more smoothly than urea and at a more convenient speed of reaction and give a more resistant product. Resorcinol, quinol and orcinol are examples of dihydric phenols suitable in the present invention and phloroglucinol and pyrogallol are examples of useful trihydric phenols. I advantageously employ resorcinol. This substance produces a final product which is not quite water white but which is clear and can be delicately tinted or colored with suitable dyes or pigments. The slight color imparted by the resorcinol is not noticeable when a filler is used or when the final product is to be colored; even in delicate or pastel shades. These delicate shades may be secured by dyes incorporated in the initial aqueous mixture. The molded product is stable in the sunlight and is not affected by hot water.

In a practical embodiment of this invention, I may add urea to a heated commercial aqueous solution of formaldehyde (35 to 40 per cent). The addition of the urea causes heat to be evolved and the solution can be kept boiling by the addition of the urea at the proper rate. Sufficient urea is added to produce a ratio of about 2 moles of formaldehyde to one of urea. The solution may then be boiled under a reflux for some time and then concentrated to a thick sirup. At this time, resorcinol can be added and the mixture reduced to dryness, ground to a powder and finally molded under heat and pressure. The addition of resorcinol, etc., may be postponed and admixture made with the dry powder of the reaction product. The effect in adding resorcinol to the wet mixture and drying the mix at the usual low temperature is not greater than where the admixture of resorcinol is postponed until after a dry powder of reaction product is obtained. Plasticizers may be added at any convenient point.

In another embodiment, formaldehyde and urea, in the molecular proportions of 2:1, may be reacted together, either at room temperature or at boiling temperature. A filler may be added to the resulting initial condensation product, resorcinol, etc., added and the mixture then dried in one of the usual drum driers. The dried product is then ground and molded as before.

I secure best results by adding a polyhydric phenol, such as resorcinol, to the primary reaction mixture in such a proportion that in the final product the molecular ratio of the aldehyde to the sum of the urea and of the polyhydric phenol varies between 1.5:1 and 1.75:1.

I obtain advantageous results with as little as from 2 to 10 per cent of resorcinol by reducing the ratio of formaldehyde to urea and polyhydroxy phenol, in part by adding more urea and in part by adding resorcinol.

The present invention is applicable in all processes of producing articles of hot pressed synthetic resins of the urea-aldehyde type, by which expression I mean those resins formed by the condensation of urea, thiourea, one of the substituted ureas, cyanamid, dicyandiamid, etc., with one of the aldehydes, such as formaldehyde, acetaldehyde, furfural, acrolein, etc.

What I claim is:—

1. In the production of synthetic resin articles, the improved process which comprises condensing urea and formaldehyde in aqueous solution, removing the water, mixing a polyhydric phenol with the dried condensation product and molding the resulting mixture under heat and pressure.

2. In the production of synthetic resin articles, the improved process which comprises condensing urea and formaldehyde in aqueous solution, removing the water, mixing resorcinol with the dried condensation product and molding the resulting mixture under heat and pressure.

3. In the manufacture of molded articles under heat and pressure, the improved process which comprises reacting urea with formaldehyde in an aqueous solution to form an initial condensation product, the molecular ratio of the formaldehyde to urea being about 2:1, evaporating the solution thus obtained to dryness, mixing the dried condensation product with a polyhydric phenol, the polyhydric phenol being added in amounts sufficient to reduce the over-all ratio of the formaldehyde to urea and said polyhydric phenol to between 1.5:1 and 1.75:1, and then molding the mixture under heat and pressure.

4. In the manufacture of molded articles from molding powders under heat and pressure, the step of preparing a molding powder which comprises mixing a polyhydric phenol with a dry powdered primary condensation product of urea and formaldehyde.

5. In the manufacture of molded articles under heat and pressure by processes involving the preparation of a molding powder, the steps which comprise forming a soluble, fusible, condensation product of urea and formaldehyde in an aqueous solution, evaporating the solution thus obtained to dryness, and mixing the dried condensation product with a polyhydric phenol.

6. In the manufacture of molded articles under heat and pressure, the process which comprises forming a condensation product of urea and formaldehyde in an aqueous solution, drying and mixing the condensation product with a polyhydric phenol, converting the dry mixture into a powder and then molding said powder under heat and pressure.

7. The process of claim 6 in which said polyhydric phenol is a dihydric phenol.

8. The process of claim 6 in which said polyhydric phenol is resorcinol.

9. As an improved molding composition, said molding composition being a dry, fusible, molding powder free from volatiles and capable of being molded under heat and pressure to give hard, shaped, infusible, stable, molded articles in which the final over-all molecular ratio of formaldehyde to the sum of urea and polyhydric phenol is between 1.5:1 and 1.75:1, said powder comprising a dry powdered mixture of a polyhydric phenol and a fusible condensation product of urea and formaldehyde obtained by reacting approximately 2 mols of formaldehyde with 1 mol of urea in aqueous solution and evaporating said solution to dryness, the amount of the polyhydric phenol being sufficient to reduce said over-all ratio to the desired value.

10. As an improved molding composition suitable for molding under heat and pressure to give shaped, stable articles, molding powders comprising a polyhydric phenol and a fusible condensation product of urea and formaldehyde, said powders being substantially dry and free from volatiles.

11. The product of claim 10 in which said polyhydric phenol is a dihydric phenol.

12. The product of claim 10 in which said polyhydric phenol is resorcinol.

13. In the manufacture of molded articles under heat and pressure, the improved process which comprises applying heat and pressure to a substantially dry, fusible molding composition to shape and then harden said composition, said molding composition comprising a substantially dry mixture of a polyhydric phenol and a fusible urea formaldehyde condensation product, the said polyhydric phenol combining with and fixing any formaldehyde generated during such molding.

14. The improvement in the manufacture of molded articles from urea formaldehyde condensation products under heat and pressure which comprises molding under heat and pressure said urea formaldehyde condensation products in the presence of a polyhydric phenol, the said polyhydric phenol combining with any formaldehyde generated during molding thereby preventing the generated formaldehyde from interfering with the production of sound, solid, non-porous molded articles.

ARTHUR M. HOWALD.